UNITED STATES PATENT OFFICE.

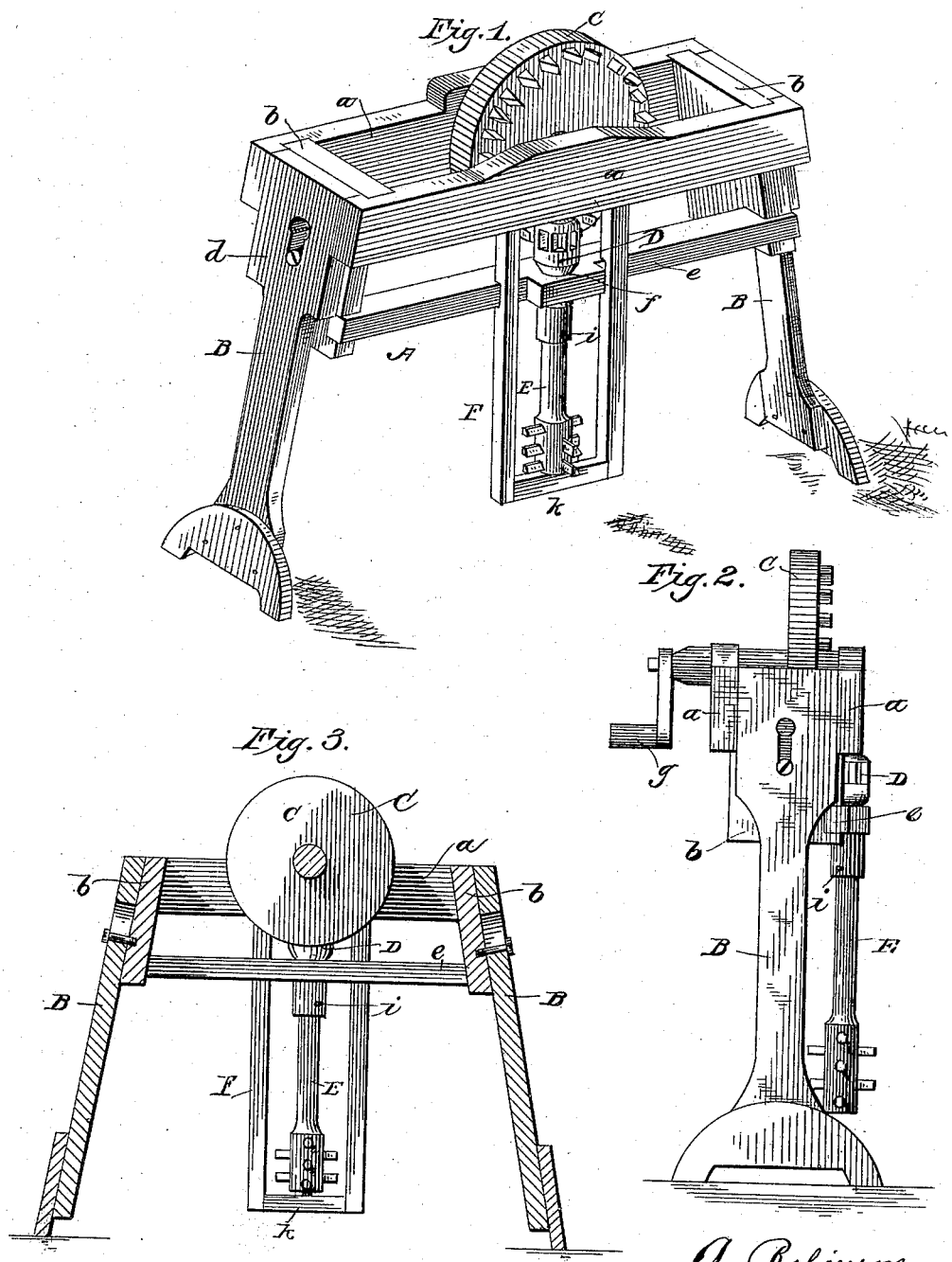

ABRAHAM ROBINSON, OF BERRY, ILLINOIS.

CHURN.

SPECIFICATION forming part of Letters Patent No. 313,886, dated March 17, 1885.

Application filed July 7, 1884. (No model.)

*To all whom it may concern:*

Be it known that I, ABRAHAM ROBINSON, a citizen of the United States, residing at Berry, in the county of Sangamon and State of Illinois, have invented a new and useful Churn, of which the following is a specification, reference being had to the accompanying drawings.

My invention relates to churn-motors; and it has for its object to provide a device of this character which may be easily operated, which shall be cheap and simple in its construction, durable in its use, and to provide means whereby the supporting legs or standards may be adjusted upon the frame carrying the dasher-actuating mechanism, so that different heights of vessels may be employed.

The invention consists in the details of contruction and combinations of parts hereinafter fully described, and pointed out in the claim.

In the drawings, Figure 1 is a perspective view of a churn-motor constructed in accordance with my invention. Fig. 2 is an end view, and Fig. 3 is a vertical cross-section, showing more clearly the manner of adjusting the supporting-legs.

In the accompanying drawings, in which like letters of reference indicate corresponding parts in all the figures, A represents the supporting-frame, which consists of the side strips, *a*, connected a short distance from each end by strips *b*, thus forming a guide or seat in which the supporting-standards B are placed, and are adapted to be vertically adjusted between said ends and upon the connecting-strips *b* by means of screws *d*, which work in elongated slots in the said supporting-standards. It will thus be seen that the legs may be either raised or lowered upon the frame a distance equal to that of the length of the slots in the supporting legs or standards, and that by tightening the screws the legs may be held securely in place at the desired adjustment. The strips *b* are connected on their lower ends and at one side thereof by means of a strip, *e*, which has an opening, *f*, at or about its center.

Between the strips *a* is mounted a shaft which is provided with a cranked handle, *g*, for operating the same. Upon this shaft is rigidly mounted, to turn therewith, a gear or master wheel, C, having the teeth arranged upon its face near the peripheral edge of said wheel.

D represents a pinion which has a bearing at its upper end in the under side of one of the strips *a*, and is supported at its lower end by means of the strip *e*, through which the shaft thereof extends. The said pinion is adapted to mesh with the master or gear wheel. Said pinion-shaft is provided with a recess or opening at its lower end to receive a dasher-shaft, E, held in place by means of a transverse pin, *i*.

To prevent the dasher from becoming broken or otherwise injured or displaced, I have provided a frame, F, consisting of the side strips or bars bearing or being seated in openings on the under side of one of the strips *a*, at their upper ends, and connected at their lower ends by a transverse strip, *k*. Said frame is also mortised to the strip *e*.

It will be seen from the above description that by the use of my improved churn-motor the milk may be placed in a can, dish, or other receptacle and effectively churned without any liability of the milk spilling or splashing; further, that by the use or employment of adjustable legs the frame may be raised or lowered as the occasion requires.

My improved motor is simple, may be manufactured and supplied at a comparatively slight cost, and its construction is effective and durable.

Having fully described my invention, what I claim as new, and desire to secure by Letters Patent, is—

The combination, with the frame consisting of the sides *a*, connected a short distance from their outer ends by strips *b*, legs or standards having elongated slots, screws for securing said legs or standards, when adjusted, upon the strips *b*, a master-wheel mounted on a shaft bearing in the strips *a*, a pinion suitably mounted to gear therewith, a dasher removably secured to said pinion, and a frame inclosing said dasher, substantially as set forth.

In testimony that I claim the foregoing as my own I have hereto affixed my signature in presence of two witnesses.

ABRAHAM ROBINSON.

Witnesses:
O. M. FOLTZ,
A. C. CURRY.